United States Patent
Crawford

(10) Patent No.: US 7,152,617 B1
(45) Date of Patent: Dec. 26, 2006

(54) HIGH PRESSURE RELEASE SAFETY VALVE ASSEMBLY

(76) Inventor: Randal Wade Crawford, 5411 Five Oaks Dr., Spring, TX (US) 77389

( * ) Notice: Subject to any disclaimer, the term of this patent is extended or adjusted under 35 U.S.C. 154(b) by 105 days.

(21) Appl. No.: 10/856,500

(22) Filed: May 28, 2004

(51) Int. Cl.
*F16K 17/36* (2006.01)

(52) U.S. Cl. ............ 137/71; 137/460; 137/513.5

(58) Field of Classification Search ......... 137/71, 137/460, 513.5, 519
See application file for complete search history.

(56) References Cited

U.S. PATENT DOCUMENTS

| | | | | |
|---|---|---|---|---|
| 2,245,271 A | * | 6/1941 | Guill | 137/517 |
| 3,618,626 A | * | 11/1971 | Russo | 137/68.14 |
| 3,648,893 A | * | 3/1972 | Whiting | 222/3 |
| 3,834,412 A | * | 9/1974 | Fannin | 137/68.23 |
| 4,201,244 A | * | 5/1980 | Quirk | 137/614.2 |
| 4,811,756 A | * | 3/1989 | Hall | 137/498 |
| 4,907,617 A | * | 3/1990 | Whalen | 137/71 |
| 5,103,860 A | * | 4/1992 | Morris | 137/460 |
| 5,215,113 A | * | 6/1993 | Terry | 137/460 |
| 5,894,859 A | * | 4/1999 | Pavlicek | 137/460 |
| 5,941,268 A | * | 8/1999 | Ross, Jr. | 137/68.14 |
| 6,112,758 A | * | 9/2000 | Wooten | 137/71 |
| 6,622,743 B1 | | 9/2003 | Kohn et al. | |
| 2002/0017319 A1 | * | 2/2002 | Hintzman et al. | 137/68.23 |

* cited by examiner

*Primary Examiner*—Eric Keasel
*Assistant Examiner*—Craig Price
(74) *Attorney, Agent, or Firm*—Mary J. Gaskin

(57) ABSTRACT

A safety valve assembly for use with a global manual valve which is installed on a high pressure cylinder or container. The safety valve assembly has a main body that is threaded into the lower bore of the global manual valve. A poppet valve slides into the bore of the main body and is restrained by a valve seat. An end cap is then threaded into the lower end of the main body to keep the poppet valve inside. The poppet valve has longitudinal flutes formed on the surface for regulated passage of gases and fluids. The poppet valve also has a cone on the upper end, which can have bleeder veins inscribed on its surface. When activated, the poppet valve prevents the uncontrolled release of high pressure out of the cylinder. Thereafter, the bleeder veins permit the release of small amounts of high pressure until the cylinder is exhausted to a safe level.

14 Claims, 6 Drawing Sheets

HIGH PRESSURE RELEASE SAFETY VALVE ASSEMBLY

FIELD OF THE INVENTION

The present invention relates to a valve assembly which prevents the release of highly pressurized gases from a gas cylinder if the manual valve fails.

BACKGROUND OF THE INVENTION

High pressure cylinders and containers, filled with different types of gases and liquids, are used for a variety of purposes. Cylinders can contain pressurized nitrogen, oxygen, helium, carbon dioxide or acetylene. Such tanks include welding cylinders, nitrous cylinders, scuba air tanks, laser machine cylinders, propane tanks, oxygen cylinders for medical uses, fire extinguishers, balloon tanks, and paintball gun cylinders. The gases and/or liquids are highly pressurized, in some cases up to 3200 psi. The tanks have manual outlet valves which regulate the flow of the pressurized gas/liquid and which close it off completely, as needed.

However, an ever-present danger exists if cylinders are improperly handled during storage, handling, shipping or use: if the manual outlet valve breaks off, is damaged, or otherwise malfunctions, the rapid escape of high pressure from the cylinder can have a torpedo effect, causing the cylinder to turn into a missile, leading to property damage and injuries, even fatalities, to bystanders. Even if the cylinder does not immediately become a rocket, no one would want to be the person who opens the damaged outlet valve in order to release the pressurized gas remaining in a cylinder with a damaged valve.

SUMMARY OF THE INVENTION

The present invention provides a valve assembly which prevents the uncontrolled release of high pressure from portable cylinders and containers when the manual valve breaks off or is damaged. In addition, inscribed veins on the poppet bleeder valve bleed off the pressure until a safe level of pressure is reached.

When fitted to an existing manual cylinder valve, the present invention has three parts: a main body part that screws into the threaded lower bore of the manual valve; a poppet bleeder valve, which slides into the bore of the main body part; and an end cap, which is threaded into the lower end of the main body part, keeping the poppet bleeder valve from falling out. Alternatively, the present invention can be integrated into a global manual valve during casting. The global manual valve will have an extended lower bore end; a poppet bleeder valve is slid into the bore of the extension, and an end cap is threaded into the lower end of the extension. In yet another alternative, the valve assembly can be incorporated into the cylinder or container by the manufacturer by threading it into the cylinder neck.

The shape of the poppet bleeder valve is the key to its effective operation. The generally cylindrical poppet bleeder valve has two or more longitudinal flutes formed in the surface, at regularly-spaced intervals. The flutes allow a normal, regulated flow of pressurized gas to pass out of the cylinder, without impeding it. One end of the poppet bleeder valve is generally cone-shaped, with regularly-spaced bleeder veins inscribed in the surface. If an unexpected failure of the manual valve occurs, which could result in an uncontrolled release of high pressure, the valve assembly responds, thrusting the cone-shaped end of the poppet bleeder valve upward toward the valve seat in upper end of the valve body, stopping the release of high pressure. Thereafter, small amounts of high pressure will be released through the bleeder veins on the cone-shaped end of the poppet bleeder valve, until the pressure remaining in the cylinder is exhausted to a safe level. The poppet bleeder valve then drops back down to rest against the end cap.

The valve assembly is easy to manufacture. The poppet bleeder valve performs effectively even if it has not been machined with precise dimensions, so long as it can move up and down inside the main body, and as long as the cone fits into the narrowed bore end of the valve main body.

The valve assembly is easy to install and is simple to operate. The assembly is simply threaded into the threaded lower bore of a pre-existing manual valve or the extension of a specially-fabricated manual valve; alternatively, it can be threaded into the threaded neck of the cylinder itself.

The poppet bleeder valve is effective in operation, whether the cylinder is held horizontally, vertically, or upside down. It functions until the container is empty.

The shape of the poppet bleeder valve can be configured for each particular application, for lower or higher pressurized gases or liquids. The valve assembly functions for a number of different applications, including paintball gun cylinders, scuba tanks, fire extinguishers, and acetylene torches.

The valve assembly would also reduce the danger that occurs when a cylinder ignites; the valve assembly would reduce the flame to a smaller, more controllable fire.

It is an object of the present invention to provide a valve assembly to make high pressure gas cylinders safer during storage, handling, shipping and use.

Yet another object of the present invention is to provide a valve assembly which responds to a potentially uncontrolled release of high pressure by mechanically moving a poppet valve to reduce the flow to a point at which the pressure can be bled off without manual intervention.

Still another object of the present invention is to provide a valve assembly which is located inside the gas cylinder, where it cannot be damaged by external events.

DESCRIPTION OF THE PREFERRED EMBODIMENT

Figure 1:
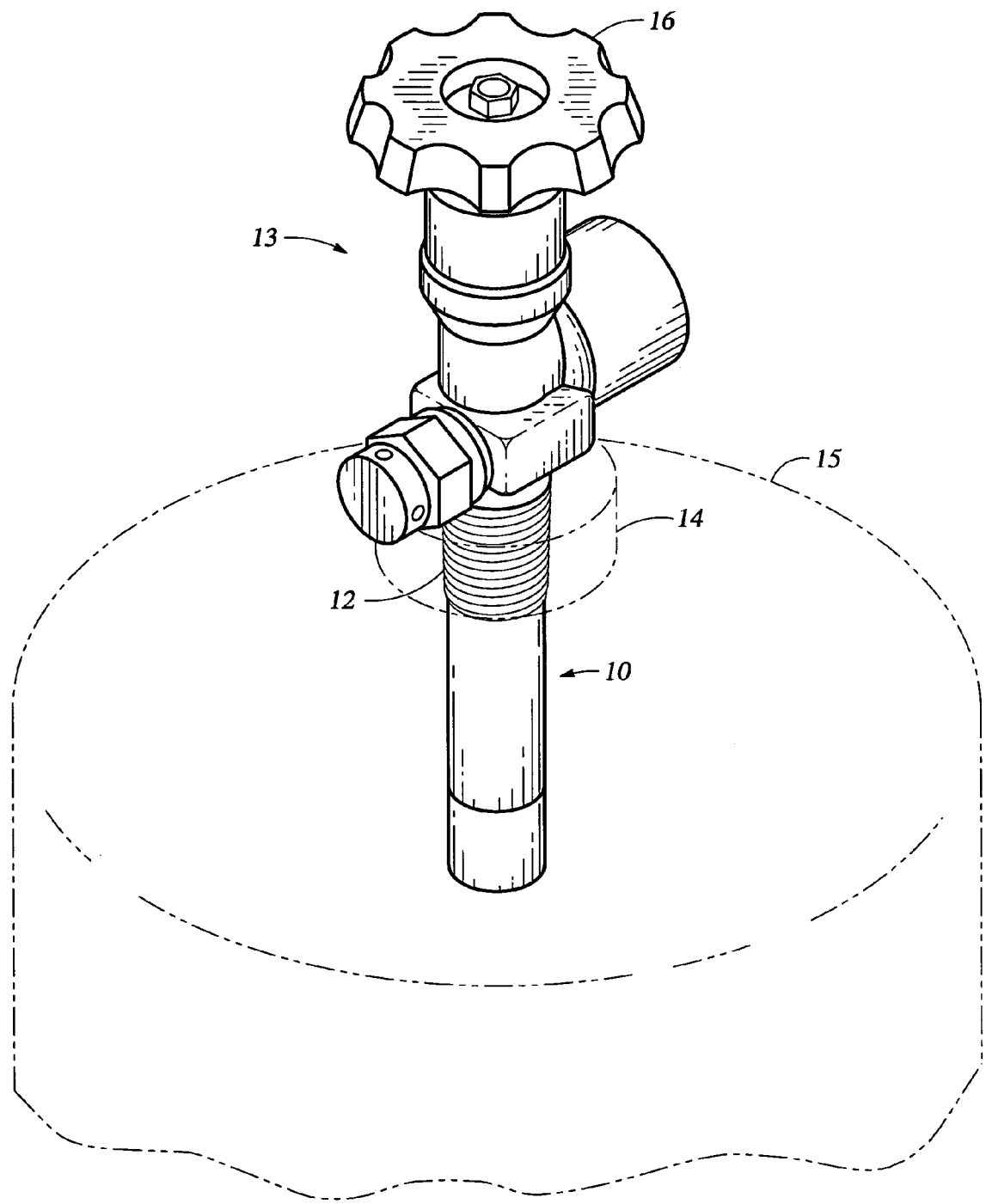
FIG. 1 is an isometric view of the valve assembly of the present invention installed on a standard global manual valve, shown inside a phantom cylinder.

As shown in FIG. 1, the safety valve assembly 10 of the present invention has been threaded into the threaded bore of the lower bore end 12 of a standard global manual valve 13, which typically is a manual valve used to control the release of high pressure. The lower end 12 of the global manual valve 13 has been threaded into the threaded neck 14 of a high pressure cylinder 15, or other container (shown with dotted lines). The flow of pressurized gas or liquid through the global manual valve 13 can be stopped by turning the valve knob 16. As can be seen, the safety valve assembly 10 is located inside the cylinder 15, where it will be unaffected if the global manual valve 13 breaks off or is damaged.

Figure 2:
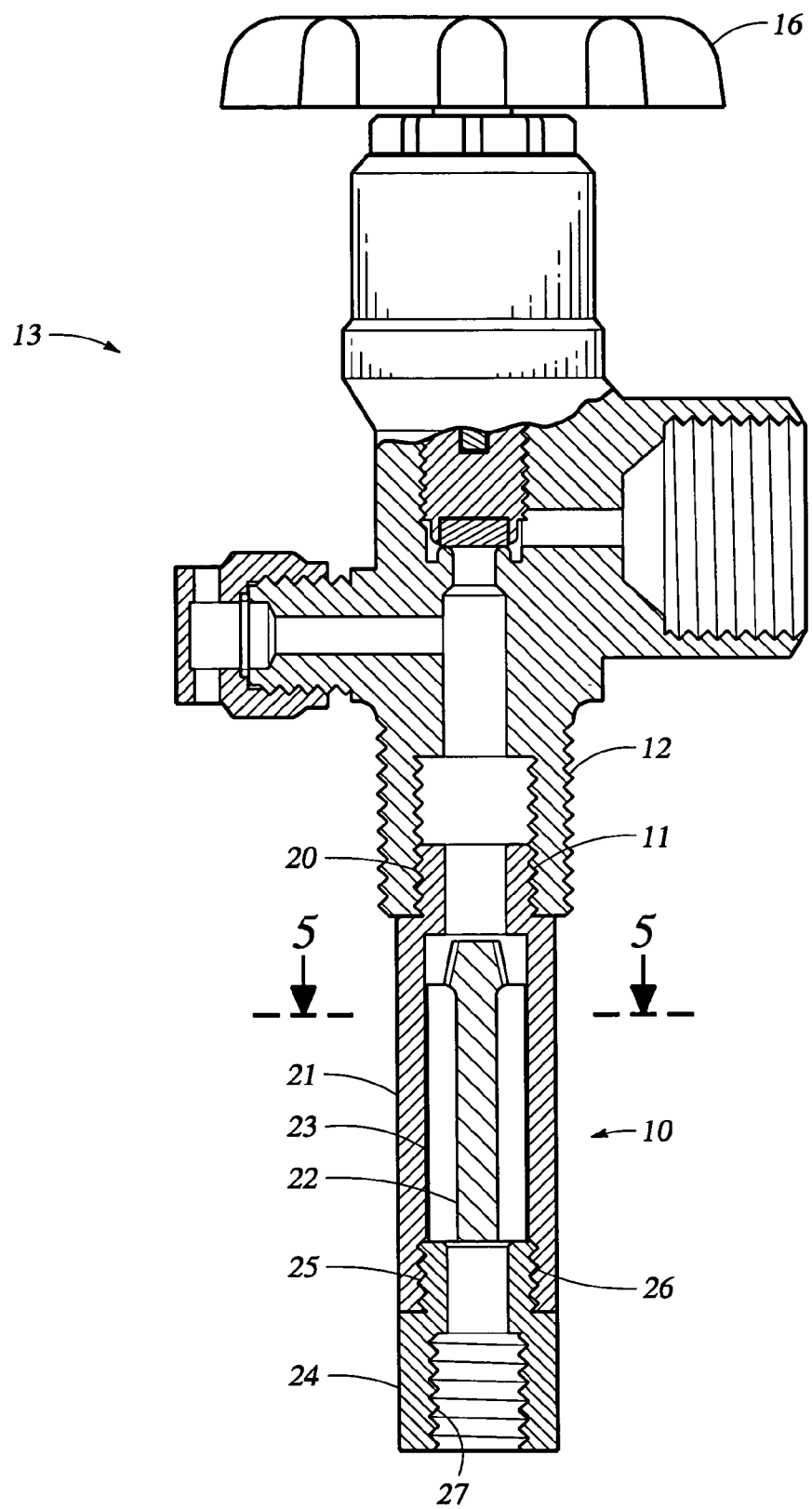
FIG. 2 is a side sectional view of the valve assembly of the present invention installed on a standard global manual valve.

The cross-sectional view of FIG. 2 more clearly shows the connection of the safety valve 10 to the global manual valve 13. The outer threaded upper end 20 of the main valve body 21 of the safety valve 10 has been threaded into the threaded bore 11 of the lower bore end 12 of the global manual valve 13, which can be controlled manually by valve knob 16. The poppet bleeder valve 22 has been inserted into the bore 23 of the main valve body 21; it is prevented from falling out by the threaded end cap 24, the other threaded upper end 25 of which has been threaded into the inner threaded lower end 26 of the main valve body. 21. The end cap 24 has a threaded bore 27, into which a liquid draw tube or tri-mix tube may be threaded.

Figure 3:
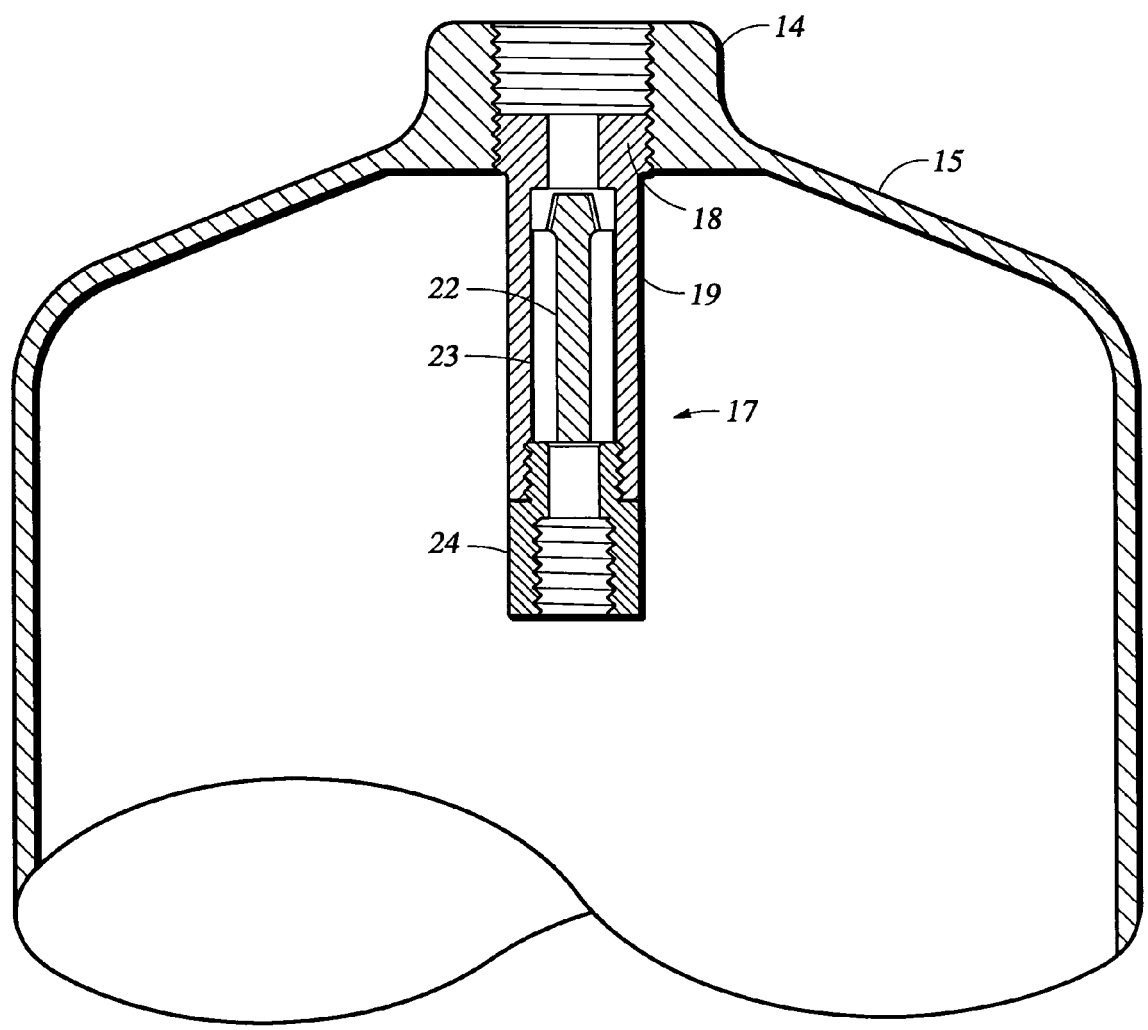
FIG. 3 is a partial side sectional view showing an alternate embodiment of the valve assembly of the present invention installed in the neck of a cylinder.

FIG. 3 shows an alternate embodiment of a safety assembly valve assembly 17 installed in the threaded neck 14 of the cylinder 15, possibly by the cylinder manufacturer. The outer threaded upper end 18 of the main valve body 19 has outer threads for threading into the threaded neck 14 of the cylinder 15 itself. The poppet bleeder valve 22 has been inserted into the bore 23 of the main valve body 19, with the threaded end cap 24 then threaded into place. As can be seen, the safety valve assembly 17 will remain intact, even if the valve with which it is used breaks off or is damaged.

Figures 4, 5, 6, 7:
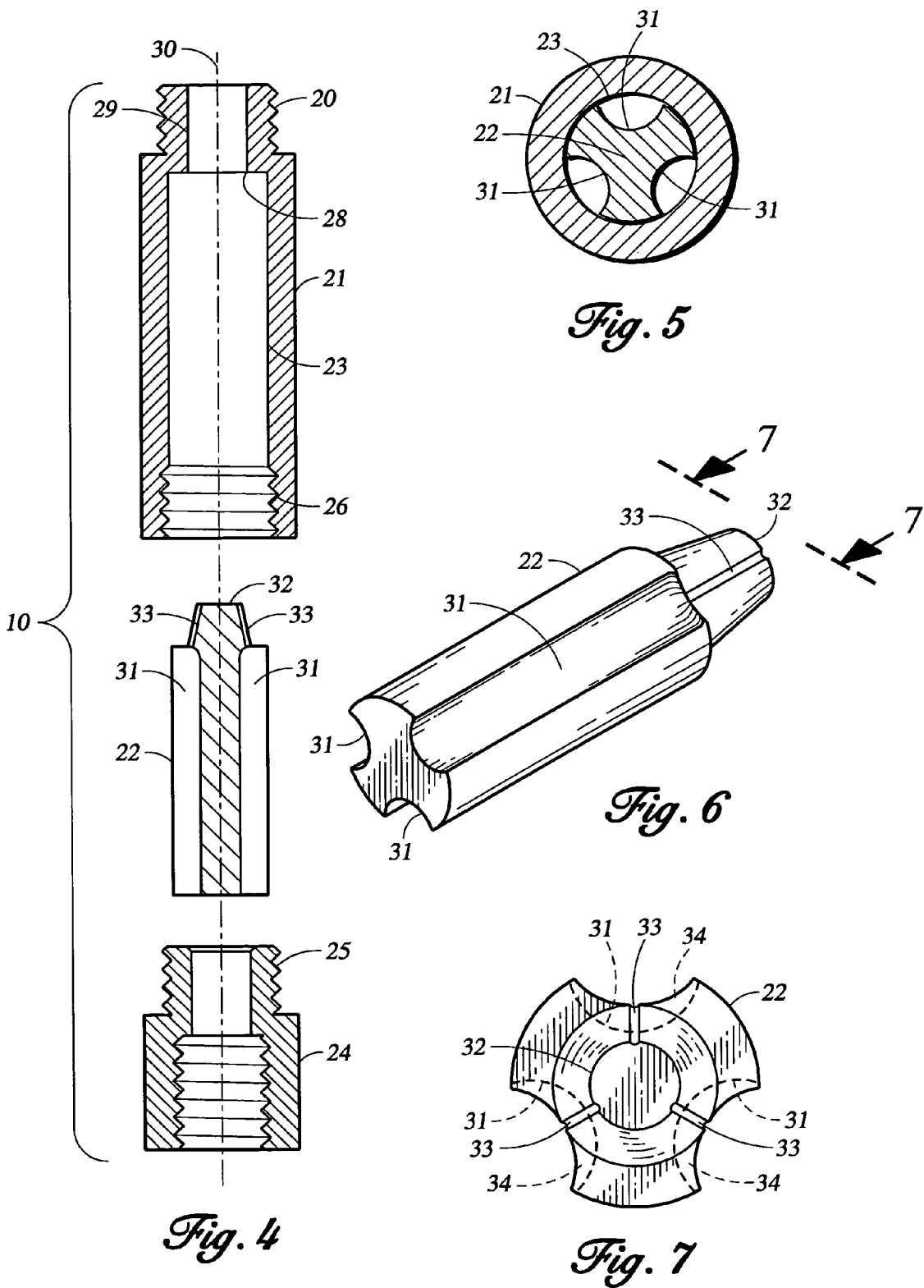
FIG. 4 is an exploded side sectional view of the valve assembly of the present invention.
FIG. 5 is a view of the installed poppet bleeder valve, taken along line 5—5 in FIG. 2.
FIG. 6 is an isometric view of the poppet bleeder valve.
FIG. 7 is a plan view of the top of the poppet bleeder valve, taken along line 7—7 in FIG. 6.

FIG. 4 shows the safety valve assembly 10 exploded along longitudinal axis 30. Main valve body 21 has an outer threaded upper end 20 and a inner threaded lower end 26, with a bore 23. Valve seat 28 keeps the poppet bleeder valve 22 inside the bore 23 when high pressure release of gas or liquid activates it. The poppet bleeder valve 22 is dimensioned to slide up and down inside the bore 23 of the main valve body 21, along the longitudinal axis 30. The poppet bleeder valve 22 has at least two (here three are used) longitudinal flutes 31, equally spaced around the outer circumference of the poppet bleeder valve 22. The upper end of the poppet bleeder valve 22 is shaped to form a cone 32, with equally-spaced longitudinal bleeder veins 33 inscribed on its surface. The number and depth of the bleeder veins 33 can vary, depending on the application. The end cap 24, upon which the poppet bleeder valve 22 rests, has an outer threaded upper end 25, which is threaded into the inner threaded lower end 26 of the main valve body 21. All three parts of the safety valve assembly 10 can be made from any of a variety of rigid materials, including metals such as stainless steel, brass, aluminum, or ferrous, or non-metal materials, such as hard plastic, or Teflon®. The selection of material used may be determined by the speed with which the valve must work to stop the uncontrolled release of pressurized gas; a poppet bleeder valve made from a lighter material would respond more quickly.

As shown in FIG. 5, the poppet bleeder valve 22 fits inside the main valve body 21. Three equally-spaced flutes 31 leave openings for the passage of gas or liquid through the bore 23 of the main valve body 21. Depending on the application, the number of flutes 31 used can vary.

The isometric view in FIG. 6 shows the shape of the poppet bleeder valve 22, with the longitudinal flutes 31 formed in the surface, the cone 32 at the upper end, and the bleeder vein 33 inscribed on the surface of the cone 32. If the global manual valve 13 fails, and the poppet bleeder valve 22 has mechanically moved to stop the flow of gas or liquid, small amounts of the gas or liquid will still be able to pass out of the main valve body 21, after moving over the upper rake 34 of each longitudinal flute 31, and through the bleeder veins 33.

FIG. 7 shows the contours of the top of the poppet bleeder valve 22, including the cone 32, the bleeder veins 33 inscribed on the surface of the cone 32, and the rake 34 of each longitudinal flute 31 (shown in dotted lines).

Figure 8:
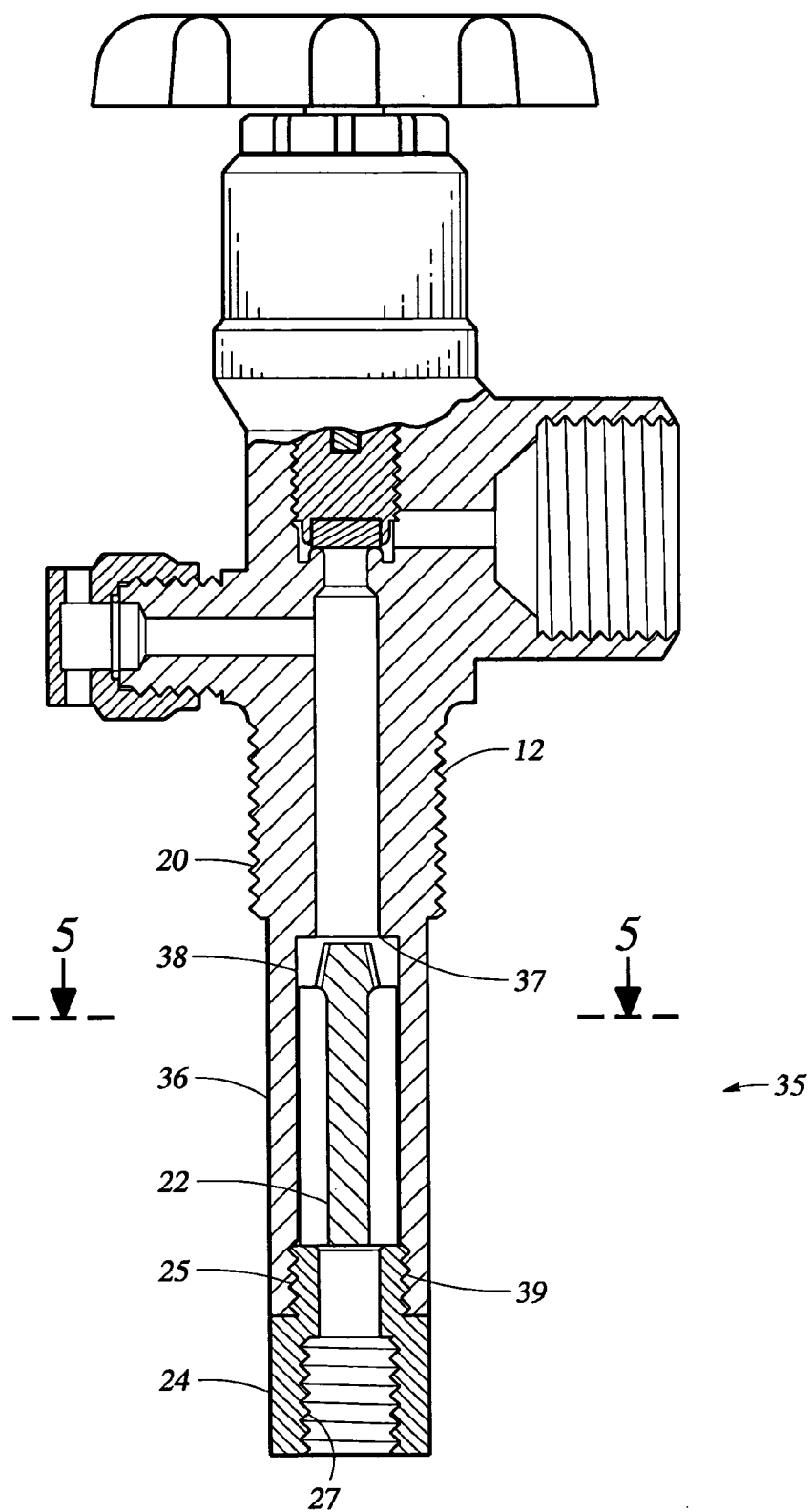
FIG. 8 is a side sectional view of an alternate embodiment of the valve assembly installed on a modified global manual valve with an extended lower bore.

In FIG. 8, the safety valve assembly 35 is incorporated as part of the global manual valve 13 itself during the manufacturing process. The lower bore end 12 of the global manual valve 13 is formed with a unitary extension section 36, which has been machined with a valve seat 37. The poppet bleeder valve 22 has been inserted into the bore 38 of the extension section 36. The valve seat 37 restrains upward movement of the poppet bleeder valve 22 out of the bore 38 when a high pressure release of gas activates it. The poppet bleeder valve 22 is prevented from falling out by the threaded end cap 24, the outer threaded upper end 25 of which has been threaded into the inner threaded lower end 39 of the extension section 36. The end cap 24 has a threaded bore 27, into which a liquid draw tube or tri-mix tube may be threaded.

Figure 9A:
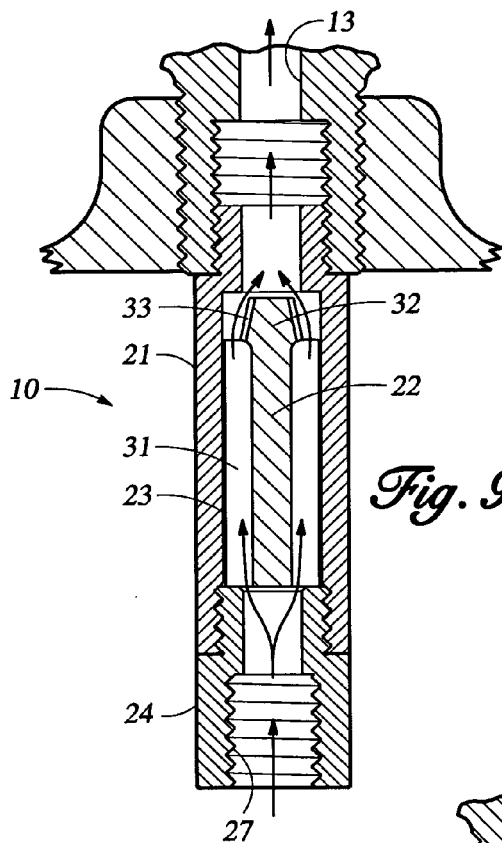
FIGS. 9A and 9B are partial sectional views of the valve assembly of the present invention as it functions to prevent the uncontrolled release of high pressure from a cylinder.

FIG. 9A shows gas or liquid moving through the safety valve assembly 10 in a controlled manner. Under normal regulated pressure, gas moves up through the bore 27 of the end cap 24, over the flutes 31 on the poppet bleeder valve 22 within the bore 23 of the main valve body 21, over the cone 32, and out through the bore of the global manual valve 13.

Figure 9B:
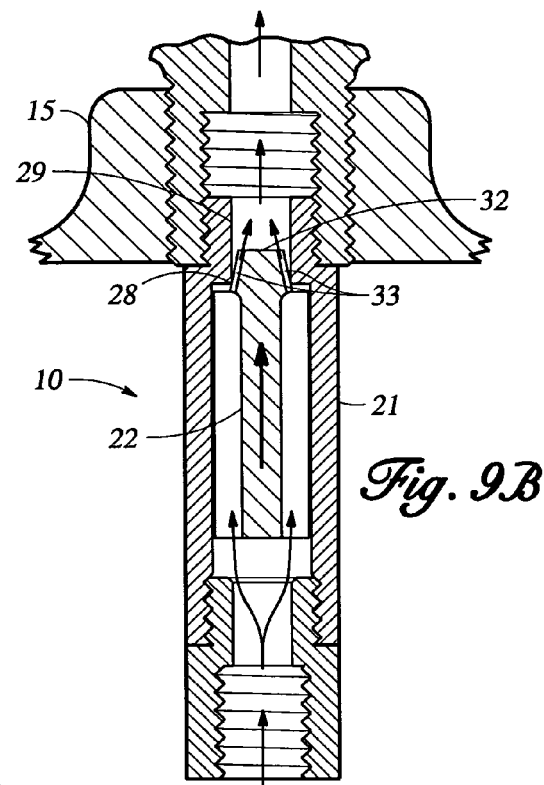

As shown in FIG. 9B, if the global manual valve 13 breaks off or an event occurs which would otherwise result in an uncontrolled release of gas, the pressurized gas, represented by the bold arrow, thrusts the poppet bleeder valve 22 upwards, lodging it against the valve seat 28 of the main valve body 21 (only the cone 32 enters the narrowed bore 29 of the main valve body), stopping a cataclysmic rush of gas or liquid out of the cylinder 15. Small amounts of gas or liquid will "bleed" out over the bleeder veins 33 inscribed on the surface of the cone 32 of the poppet bleeder valve 22, in order to depressurize the cylinder 15 gradually. A similar sequence of events occurs if someone opens the manual valve in order to check the capacity of gas. The poppet bleeder valve 22 moves upwards, and stops the flow of gas. The bleeder veins 33 automatically equalize the pressure, and when the manual valve is closed, the poppet bleeder valve 22 drops back to the open position shown in FIG. 9A.

Figure 10:
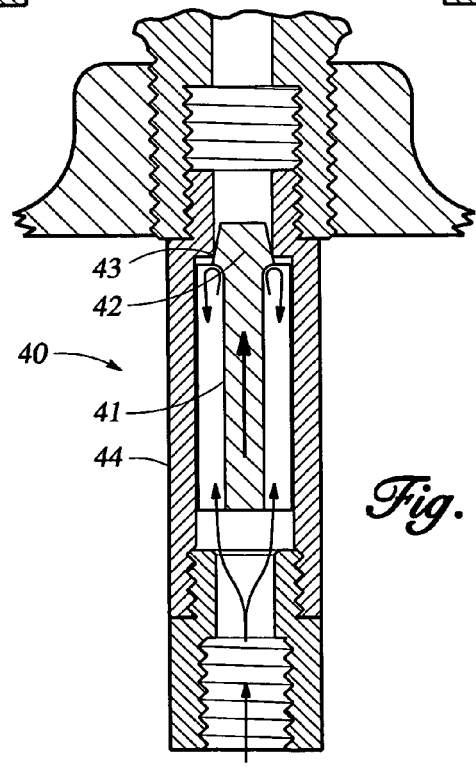
FIG. 10 is a partial sectional view of a safety valve assembly having a poppet valve without bleeder veins, showing that the flow of pressure has been completely shut down.

FIG. 10 shows the effectiveness of an alternate embodiment of the safety valve assembly 40, which has a poppet valve 41 with no bleeder veins inscribed on its cone 42. The pressurized gas, represented by the bold arrow, has thrust the poppet valve 41 upwards, lodging it against the valve seat 43 of the main valve body 44, completely shutting down the flow of gas or liquid from the cylinder 15.

I claim:

1. A safety valve assembly for use with a global manual valve on a high pressure cylinder, the safety valve assembly comprising:

a cylindrical valve body having a bore with one valve seat formed thereon, the valve body having a first end and a second end;

a generally cylindrical poppet valve having a first end and a flat second end and having a plurality of longitudinal flutes formed thereon from the first end of the valve to the second end of the valve and further having a cone-shaped extension on the first end of the poppet valve;

a cylindrical end cap having an open-ended bore; and means for connecting the end cap to the second end of the valve body;

the poppet valve being inserted into the bore of the valve body with the cone-shaped extension being oriented toward the first end of the valve body, the movement of the poppet valve out of the first end of the valve body being restrained by the valve seat, the end cap then being connected to the second end of the valve body, the movement of the poppet valve out of the second end of the valve body thereupon being restrained by the end cap; and means for connecting the first end of the valve body to the global manual valve;

the safety valve assembly being disposed entirely within the cylinder.

2. The safety valve assembly of claim 1 wherein the bore at the second end of the valve body has threads and the means for connecting the end cap to the second end of the valve body are threads on the end cap.

3. The safety valve assembly of claim 1 wherein the global manual valve has a lower bore with inner threads, and the means for connecting the first end of the valve body to the global valve are outer threads on the first end of the valve body.

4. The safety valve assembly of claim 1 which further comprises a plurality of longitudinal bleeder veins inscribed on the cone-shaped extension of the poppet valve.

5. The safety valve assembly of claim 1 wherein the bore of the end cap has threads for connection to a tube.

6. A safety valve assembly for use with a high pressure cylinder having a neck on which a global manual valve can be installed, the safety valve assembly comprising:

a cylindrical valve body having a bore with one valve seat formed thereon, the valve body having a first end and a second end;

a generally cylindrical poppet valve having a first end and a flat second end and having a plurality of longitudinal flutes formed thereon from the first end of the valve to the second end of the valve and further having a cone-shaped extension on the first end of the poppet valve;

a cylindrical end cap having an open-ended bore;

means for connecting the end cap to the second end of the valve body;

the poppet valve being inserted into the bore of the valve body with the cone-shaped extension being oriented toward the first end of the valve body, the movement of the poppet valve out of the first end of the valve body being restrained by the valve seat, the end cap then being connected to the second end of the valve body, the movement of the poppet valve out of the second end of the valve body thereupon being restrained by the end cap; and means for connecting the first end of the valve body to the neck of the cylinder;

the safety valve assembly being disposed entirely within the cylinder.

7. The safety valve assembly of claim 6 wherein the bore at the second end of the valve body has threads and the means for connecting the end cap to the second end of the valve body are threads on the end cap.

8. The safety valve assembly of claim 6 wherein the neck of the cylinder has a bore with threads, and the means for connecting the first end of the valve body to the neck of the cylinder are outer threads on the first end of the valve body.

9. The safety valve assembly of claim 6 which further comprises a plurality of longitudinal bleeder veins inscribed on the cone-shaped extension of the poppet valve.

10. The safety valve assembly of claim 6 wherein the bore of the end cap has threads for connection to a tube.

11. A safety valve assembly for use with a high pressure cylinder, the safety valve assembly comprising:

a global manual valve having an extended lower bore with one valve seat formed thereon, the lower bore having an end;

a generally cylindrical poppet valve having a first end and a flat second end and having a plurality of longitudinal flutes formed thereon from the first end of the valve to the second end of the valve and further having a cone-shaped extension on the first end of the poppet valve;

a cylindrical end cap having an open-ended bore; and means for connecting the end cap to the end of the lower bore of the global manual valve;

the poppet valve being inserted into the lower bore of the global manual valve with the cone-shaped extension being oriented toward the global manual valve, the movement of the poppet valve being restrained by the valve seat, the end cap then being connected to the end of the lower bore of the global manual valve, the movement of the poppet valve out of the lower bore thereupon being restrained by the end cap.

12. The safety valve assembly of claim 11 wherein the end of the lower bore of the global manual valve has threads and the means for connecting the end cap to the end of the lower bore are threads on the end cap.

13. The safety valve assembly of claim 11 which further comprises a plurality of longitudinal bleeder veins inscribed on the cone-shaped extension of the poppet valve.

14. The safety valve assembly of claim 11 wherein the bore of the end cap has threads for connection to a tube.

* * * * *